United States Patent [19]

Schobbe et al.

[11] Patent Number: 5,186,440
[45] Date of Patent: Feb. 16, 1993

[54] SUPPORTING MOUNT

[75] Inventors: Hermann Schobbe, Fellbach; Gerd Steinhauser, Aichwald; Hans Scheerer, Esslingen; Andreas Opara; Werner Möhrmann, both of Fellbach; Hans-Rudolf Steinert, Wendlingen; Wolfhard König, Stuttgart, all of Fed. Rep. of Germany

[73] Assignee: Mercedes-Benz AG, Fed. Rep. of Germany

[21] Appl. No.: 745,403

[22] Filed: Aug. 15, 1991

[30] Foreign Application Priority Data

Aug. 23, 1990 [DE] Fed. Rep. of Germany ....... 4026645

[51] Int. Cl.$^5$ ............................................. B60G 13/00
[52] U.S. Cl. ...................................... 267/220; 267/33; 280/688
[58] Field of Search ............. 267/33, 35, 140.2–140.4, 267/220, 292; 280/660, 668, 671, 688, 692, 696, 716

[56] References Cited

U.S. PATENT DOCUMENTS

| 3,037,787 | 6/1962 | Gottschald . | |
|---|---|---|---|
| 3,063,744 | 11/1962 | Flumerfelt . | |
| 3,193,056 | 7/1965 | Clay . | |
| 4,175,771 | 11/1979 | Muzechuk et al. | 267/220 |
| 4,290,626 | 9/1981 | Sullivan, Jr. et al. | 280/692 |
| 4,462,608 | 7/1984 | Lederman | 280/668 |
| 4,477,061 | 10/1984 | Kawaura et al. | 280/668 |
| 4,478,396 | 10/1984 | Kawaura | 267/220 |
| 4,805,886 | 2/1989 | Hassan | 267/220 |

FOREIGN PATENT DOCUMENTS

| 212647 | 12/1960 | Austria . | |
|---|---|---|---|
| 854731 | 11/1952 | Fed. Rep. of Germany . | |
| 1953107 | 11/1966 | Fed. Rep. of Germany . | |
| 2852655 | 6/1978 | Fed. Rep. of Germany . | |
| 8132963 | 11/1981 | Fed. Rep. of Germany . | |
| 3445984 | 6/1986 | Fed. Rep. of Germany . | |
| 3822421 | 1/1990 | Fed. Rep. of Germany | 267/220 |
| 323412 | 9/1957 | Switzerland . | |
| 0899650 | 6/1962 | United Kingdom | 267/220 |
| 2050557 | 1/1981 | United Kingdom . | |
| 2161240 | 1/1986 | United Kingdom . | |

Primary Examiner—Douglas C. Butler
Assistant Examiner—Chris Schwartz
Attorney, Agent, or Firm—Evenson, Wands, Edwards, Lenahan & McKeown

[57] ABSTRACT

A supporting mount for the angularly mobile flexible support of a supporting member of a wheel suspension, especially a shock absorber, has a mount core which is vulcanized into an elastomer body and the movements of which are limited in the supporting direction by stops fixed in relation to the housing. The elastomer body is prestressed in the mount housing in the supporting direction and held in a manner which does not involve contact with the stops. The supporting mount makes it possible to introduce small supporting forces comfortably into the vehicle bodywork by a soft characteristic while larger supporting forces are transmitted by the stops via a progressively hardening characteristic.

8 Claims, 1 Drawing Sheet

SUPPORTING MOUNT

BACKGROUND AND SUMMARY OF THE INVENTION

The invention relates to a supporting mount for the angularly mobile flexible support of a wheel suspension supporting member, especially of a shock absorber, and, more specifically, to a supporting mount with a mount core accommodated without play by an elastomer body, provided inside a mount housing. The movements of the mount core are limited in the supporting direction via the elastomer body by stops that are fixed in relation to the housing.

A supporting mount of this kind is known from FIG. 2 of U.S. Pat. No. 3,037,787, the elastomer body of the mount is formed by two rubber annular bodies which are inserted into the mount housing coaxially to one another and between them accommodate a flange which is formed on the base of a hemispherical section of the mount core accommodated by one of the annular bodies.

The mount housing is of a design which resembles an inverted cup. A central opening is provided in its base situated at the top. The annular body which accommodates the hemispherical section of the mount core engages partially between the rim of the base opening and the hemispherical section of the core provided at a distance from the base. The other elastomeric annular body is supported against both the flange of the mount core and against a lower, annular housing closure part. The lower, annular closing part is penetrated by the lower part of the mount core screwed onto the upper end of a piston rod of a shock absorber.

The rim part of the base of the mount housing and the annular housing closure part assume the function of a stop for limiting the movements of the mount core in the supporting direction of the shock absorber.

In this design of the mount, the two elastomeric annular bodies are subject to a compressive load, in each case in one supporting direction. The life of both annular bodies is greatly reduced by the load. This results from the fact that, when the mount is subjected to stress, the annular bodies are partially squeezed hard between the rim of the opening of the housing base or housing closure part and the mount core or flange of the latter. In addition, the annular body which accommodates the hemispherical part of the mount core is subjected to damaging frictional influences in the case of angular movements of the shock-absorber piston rod.

Finally, in view of the desired mount characteristic the rubber annular bodies must be of correspondingly large dimensions. This is particularly true of the annular body provided between the flange of the mount core and the housing base in view of the fact that this annular body has to take up a preload due to the weight of the vehicle. The supporting mount must therefore be of a disproportionately large configuration and accordingly takes up a correspondingly large installation space.

There is therefore needed a supporting mount configured in an embodiment in accordance with the above-described prior mounts in such a way that it can be configured with improved spring properties in essentially smaller dimensions and can be produced with a smaller number of parts, hence economically. In addition, it should be distinguished by having a long life and operating in a frictionless manner.

These needs are met according to the present invention by a supporting mount for the angularly mobile flexible support of a supporting member of a wheel suspension, especially a shock absorber, with a mount core, accommodated without play by an elastomer body, provided inside a mount housing. The movements of the mount core are limited in the supporting direction via the elastomer body by stops fixed in relation to the housing wherein the mount core is vulcanized into the elastomer body. The elastomer body is prestressed in the supporting direction in the mount housing and is non-contacting in relation to the stops.

In the design of mount according to the present invention, the mount core interacts with the elastomer body in a frictionless manner because it is vulcanized into the latter. Due to the prestressed arrangement of the elastomer body in the mount housing, it is subject to shear stresses which can be taken up by it in a favorable manner in both supporting directions. To achieve a desired mount characteristic, a one-piece elastomer body is sufficient, correspondingly little construction space being required to accommodate it. The entire mount design can accordingly be configured in a manner which is economical for production. Despite the small size of the mount dimensions, the distances between the prestressed elastomer body and the stops can at the same time be stipulated such that small supporting forces are introduced into the vehicle part concerned with a soft spring characteristic and large supporting forces are introduced into the vehicle part concerned in accordance with requirements via a spring characteristic which hardens in a correspondingly progressive manner.

In addition to the supporting mount in accordance with FIG. 2 of U.S. Pat. No. 3,037,787, FIG. 3 of the U.S. patent already shows a supporting mount with a mount core which is vulcanized into a one-piece elastomer body. However, the one-piece elastomer body is not inserted into the mount housing with prestress but rather is vulcanized into a stop-free support casing.

Other objects, advantages and novel features of the present invention will become apparent from the following detailed description of the invention when considered in conjunction with the accompanying drawings.

DETAILED DESCRIPTION OF THE DRAWINGS

Figure 1:
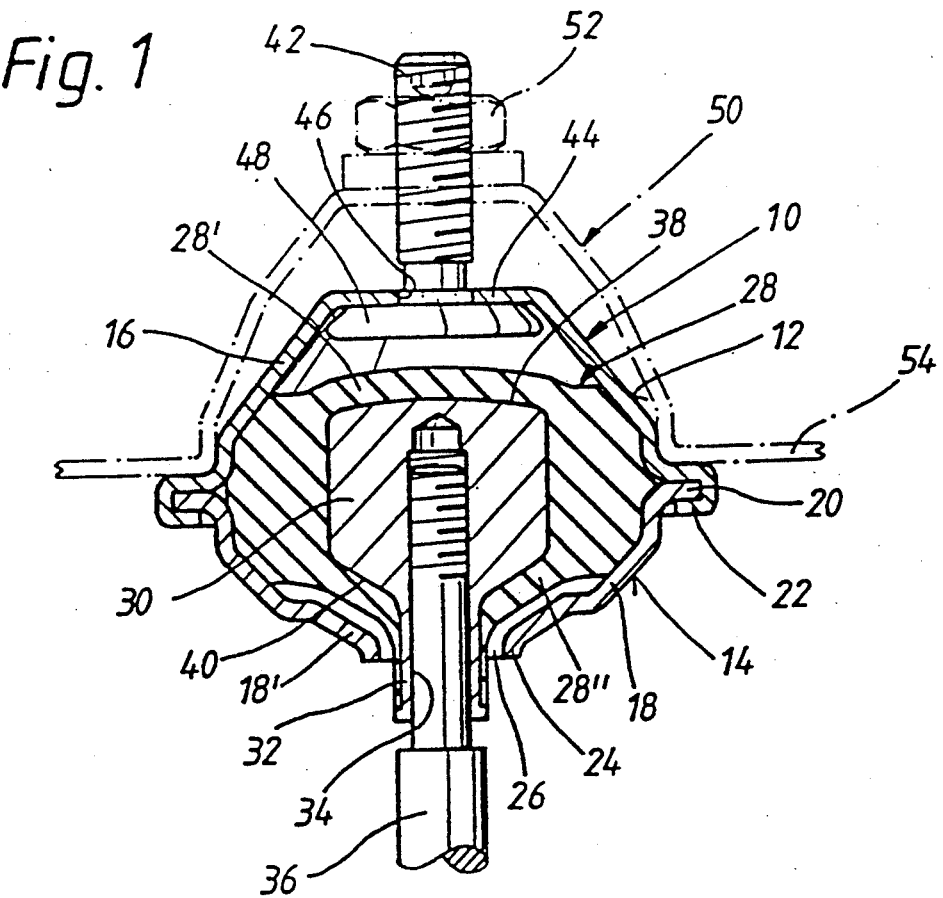
FIG. 1 is a longitudinal sectional view of a supporting mount according to the present invention.

The supporting mount according to FIG. 1 has a mount housing 10, which is formed by two mutually corresponding housing parts 12 and 14 of approximately the same shape. Each of these parts has a lateral-surface portion 16 and 18, respectively, of frustoconical design and are firmly connected to one another by means of flange-like rim parts 20 and 22. This is accomplished, for example, by flanging.

In this arrangement, the two housing parts 12 and 14 form a capsule with a lower capsule opening 26 bounded by a projecting neck 24.

An elastomer body 28, which preferably consists of rubber and is fixed between the two housing parts 12 and 14, is prestressed in the axial direction of the mount housing 10.

The compressive stress on the elastomer body 28 which is required for prestressing the elastomer body 28 is obtained by clamping the elastomer body 28 between the two conical lateral-surface portions 16 and 18 of the mount housing 10. In conjunction, a mount core 30, preferably of rotationally symmetrical design in the axial direction of the mount housing 10, is vulcanized into the elastomer body 28.

The mount core 30 is preferably vulcanized in the elastomer body 28 in such a way as to be surrounded on all sides by the elastomer body 28. The mount core 30 includes a neck 32 which protrudes through the capsule opening 26. The neck is penetrated by a threaded hole 34 which extends into the mount core 30 and into which a supporting member 36, for example, the end of a shock-absorber piston rod or a connection part of a wheel suspension link or the like, can be screwed in.

The end face 38 of the mount core 30, facing away from the supporting member 36, preferably has a slight convex curvature and is covered by a covering layer 28' having a damping effect and formed by part of the elastomer body 28.

According to FIG. 1, the end face 40 of the mount core 30, having the neck 32, tapers downward. The degree of taper of end face 40 is chosen such that it has essentially the degree of taper of a lateral-surface portion 18' extending between the lateral-surface portion 18 and the collar 24. The lateral surface portion 18' is to be regarded as the base of the housing and accordingly has a smaller degree of taper than the lateral-surface portion 18.

In a manner analogous to the end face 38 of the mount core 30, the end face 40 is covered by a covering layer 28" having a damping effect and formed by part of the elastomer body 28.

A mount fastening screw 42 is inserted through an opening 46 provided in the center of an upper wall part 44 lying perpendicular to the axis of the mount. The screw 42 is supported by a flat head 48 in the interior of the housing part 12.

In the construction position shown in FIG. 1, the flat head 48 is at a distance from the upper covering layer 28' of the mount core 30 and the lower covering layer 28" of the latter is at a distance from the lateral-surface position 18'. The upper free path for the supporting member 36 preferably is chosen to be bigger than the lower free path of the latter.

In conjunction with the covering layers 28' and 28", the flat head 48 and the lateral-surface portion 18' thus form bump and rebound stops which limit the axial movement of the mount core 30.

As indicated in broken lines in FIG. 1, the supporting mount, in so far as it is used, for example, for the purpose of supporting a piston rod 36 of a shock-absorber strut, can preferably be inserted, with its upper housing part 12, into a correspondingly formed dome on the body. The supporting mount can be fastened by virtue of the fact that the upper housing part 12 can be clamped by its projecting and flanged rim part 22 on the rim part 54 of the dome 50, preferably with the interposition of a sealing layer, with the aid of the fastening screw 42 and a tightening nut 52.

With a soft mount characteristic, the possible free paths of the mount core 30 make it possible to introduce relatively small supporting forces into, for example, a vehicle body in a comfortable manner. Larger or large supporting forces, on the other hand, are transmitted in a manner which corresponds to requirements, via a progressively hardening mount characteristic, by the coming into contact of the covering layers 28' and 28" of the mount core 30 with the bump and rebound stops fixed to the housing and formed by parts 18' and 48.

Figure 2:
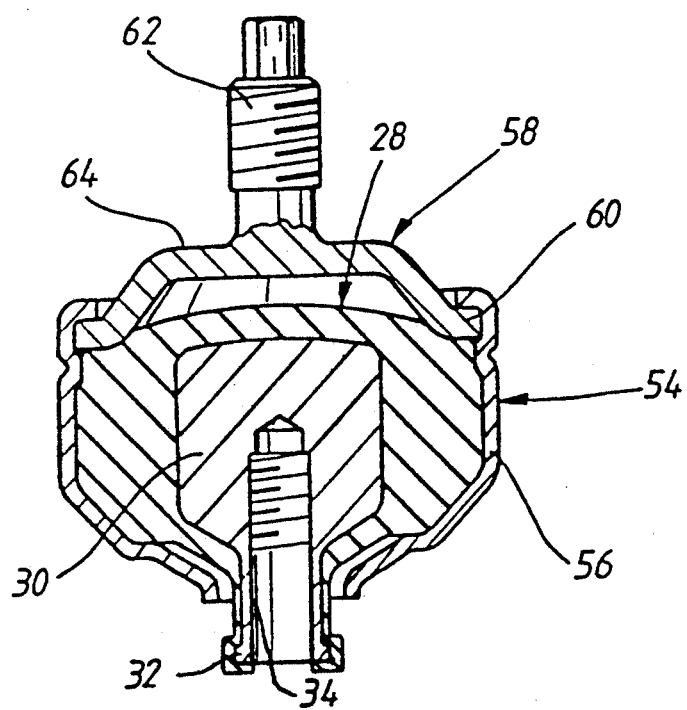
FIG. 2 is a longitudinal sectional view of another embodiment of a mount according to the present invention.

The supporting mount according to FIG. 2 differs from that explained above solely in the design of the mount housing, denoted overall by 54. The lower housing part 56 is of an analogous design in the lower region to the lower housing part 14 of the illustrative embodiment described with respect to FIG. 1. Parts which are like those of the embodiment in accordance with FIG. 1 are therefore denoted by corresponding reference numerals.

The upper housing part 58 is a cover which simultaneously forms an upper stop for the mount core 30 and is positioned with its rim part 60 in the lower housing part 54, preferably by flanging in, in such a way that the elastomer body 28 has the desired prestress.

In this design variant, which is distinguished by a particularly small overall length, a fastening screw 62 is formed directly on the outer front face 64 of the cover, at the center. This embodiment is also particularly suited in view of its small mount dimensions for arrangement between a link and a shock absorber or link and wheel carrier or body.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A supporting mount for angularly mobile flexible support of a supporting member of a wheel suspension, comprising:
   a mount housing including two approximately conical housing halves;
   an elastomer body provided inside said mount housing;
   a mount core enclosed by said elastomer body;
   housing-side stops provided in supporting directions for engaging said elastomer body, said housing-side stops limiting the travel of said mount core in the supporting directions;
   wherein said elastomer body as constructed is spaced at a distance from said housing-side stops in a non-contacting relationship;
   further wherein one of said conical housing halves provide an opening to said mount core, said one conical housing halve including a ring half as one of said housing-side stops which encloses the opening and is outwardly offset in a stepped manner towards the mount core; and wherein said mount core is surrounded on all sides by said elastomer body.

2. A supporting mount according to claim 1, wherein said mount core has an essentially flat design on an end face away from said supporting member.

3. A supporting mount according to claim 1, further comprising:
   a threaded stem provided in alignment with said supporting member on a wall part of the mount housing facing away from said supporting member for fastening the supporting mount.

4. A supporting mount according to claim 1, wherein said mount housing comprises two approximately frustoconical housing halves having tapering wall parts, said housing halves complementing each other approximately in shape, said elastomer body being clamped between the tapering wall parts.

5. A supporting mount according to claim 4, wherein said mount housing has a cup-like shape and includes a cover for closing the mount housing at a side facing away from the supporting member, said cover having a rim resting on said elastomer body and a center at which a threaded stem for fastening the supporting mount is formed on the outside.

6. A supporting mount according to claim 1, wherein said supporting member is a shock absorber.

7. A supporting mount for angularly mobile flexible support of a supporting member of a wheel suspension, comprising:
   a mount housing;
   an elastomer body;
   a mount core being accommodated without play by said elastomer body, aid mount core and elastomer body being provided inside said mount housing;
   housing-side stops provided in supporting directions of the mount core, wherein movement of said mount core is limited in the supporting directions via said elastomer body contacting the stops;
   further wherein said mount core is vulcanized into said elastomer body, said elastomer body being prestressed in one supporting direction in said mount housing in non-contacting relation to the stops; and
   a threaded stem provided in alignment with said supporting member on a wall part of the mount housing facing away from said supporting member for fastening the supporting mount.

8. A supporting mount for angularly mobile flexible support of a supporting member of a wheel suspension, comprising:
   a mount housing;
   an elastomer body;
   a mount core being accommodated without play by said elastomer body, said mount core and elastomer body being provided inside said mount housing;
   housing-side stops provided in supporting directions of the mount core, wherein movement of said mount core is limited in the supporting directions via said elastomer body contacting the stops;
   further wherein said mount core is vulcanized into said elastomer body, said elastomer body being prestressed in one supporting direction in said mount housing in non-contacting relation to the stops; and
   wherein said mount housing has a cup-like shape and includes a cover for closing the mount housing at a side facing away from the supporting member, said cover having a rim resting on said elastomer body and a center at which a threaded stem for fastening the supporting mount is formed on the outside.

* * * * *